Aug. 24, 1926.
H. I. MORRIS
1,597,458
MACHINE FOR AND PROCESS OF MAKING COMPOSITE WEBS
Original Filed August 8, 1918   6 Sheets-Sheet 4
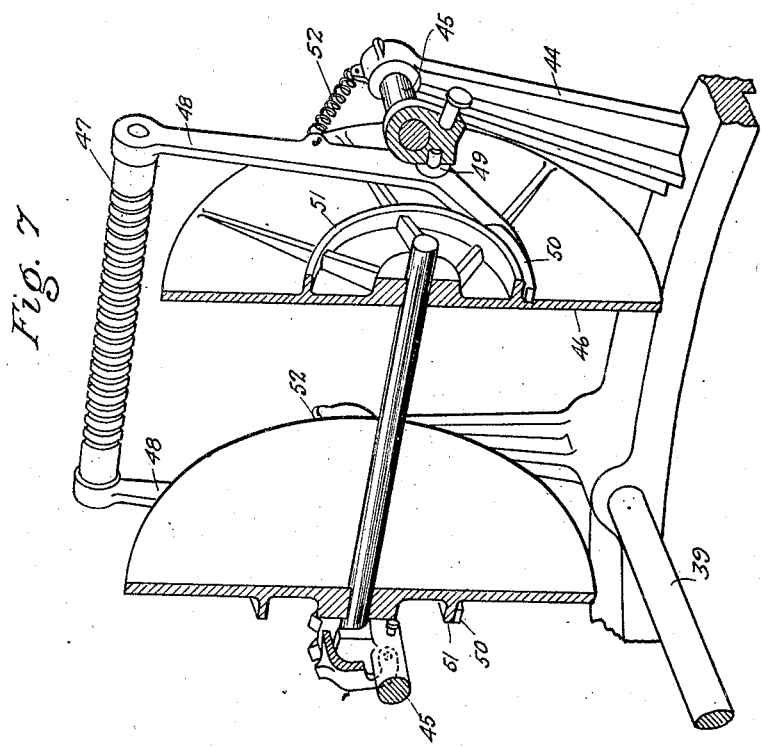
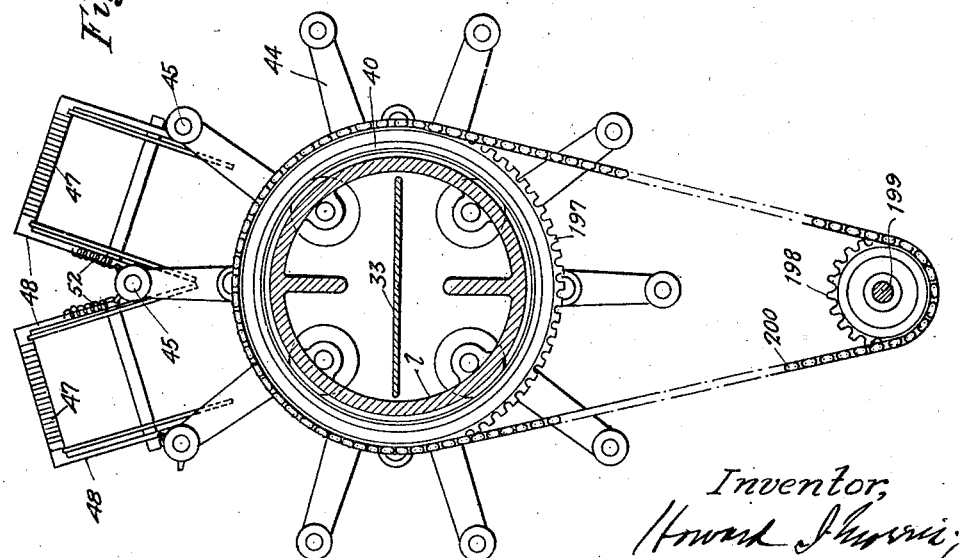

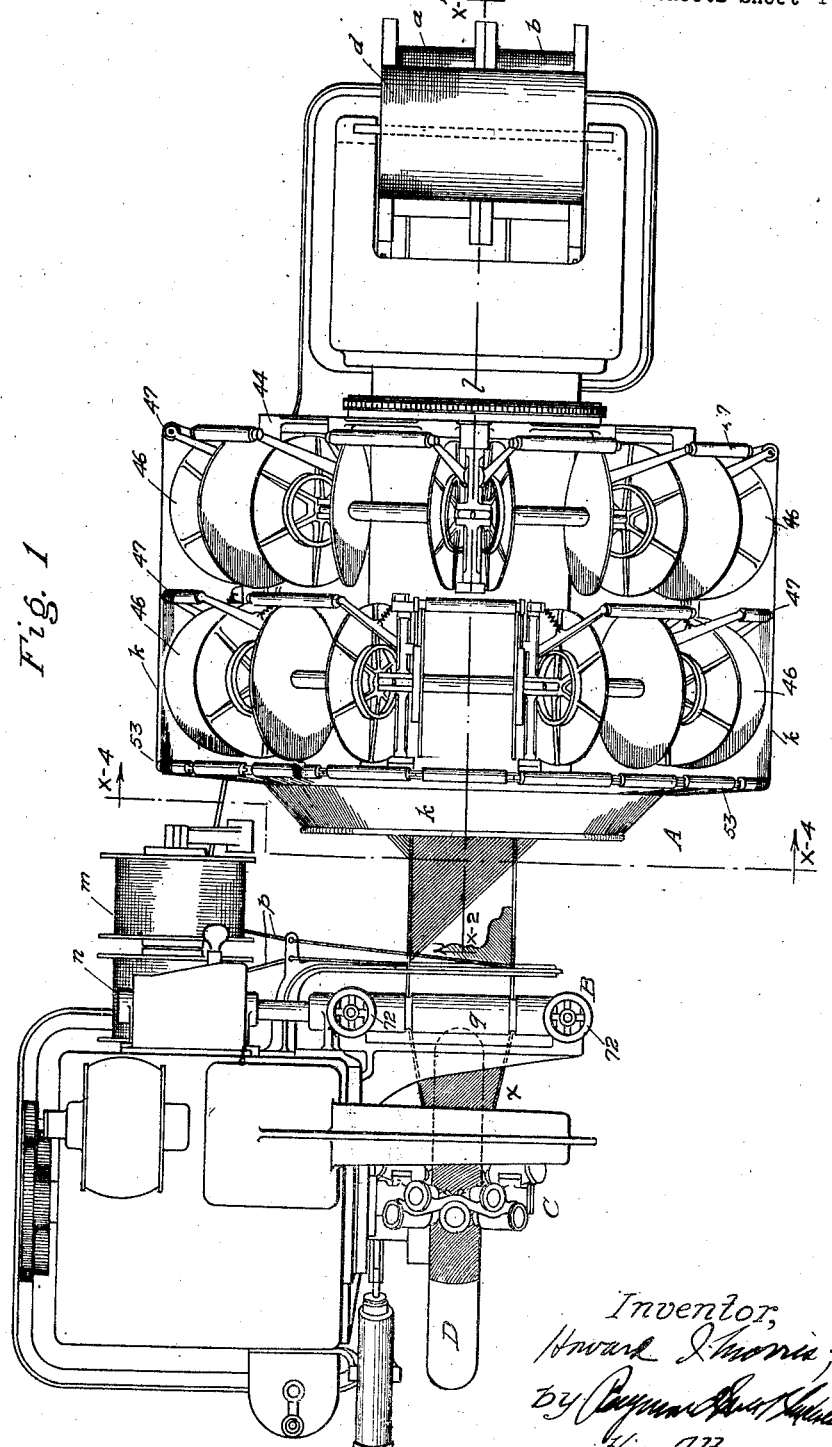

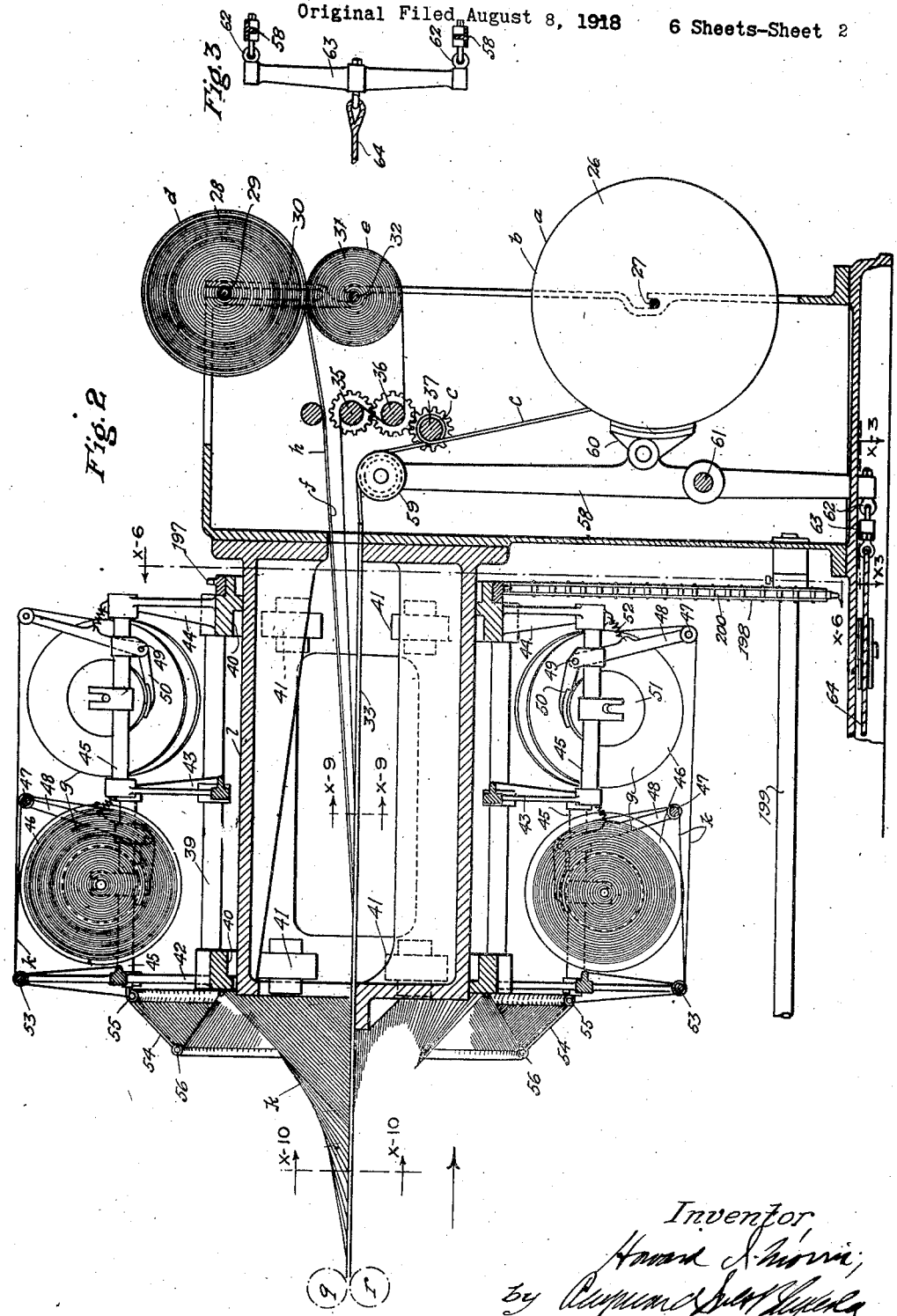

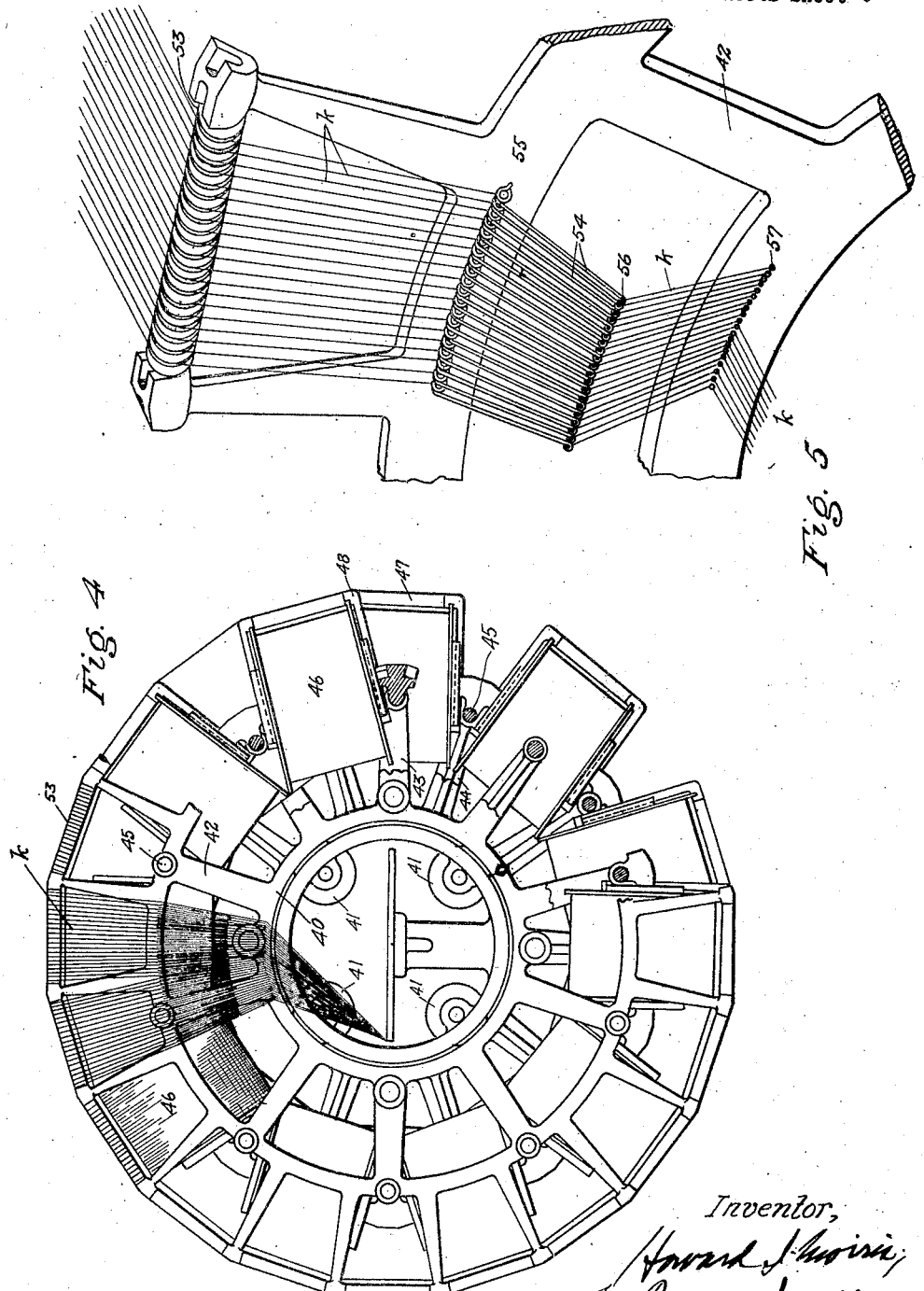

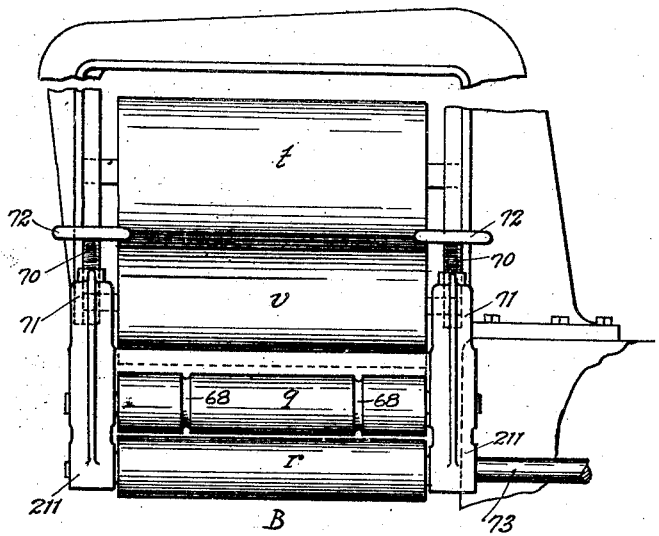

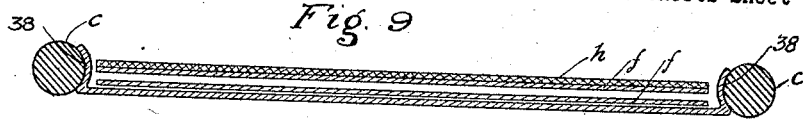
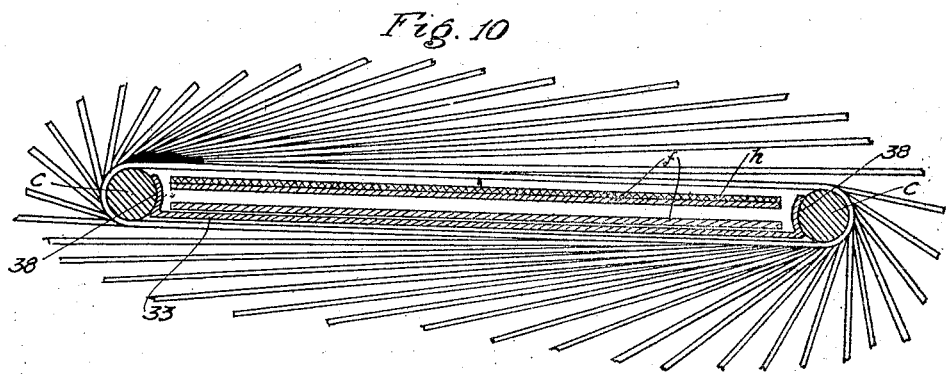
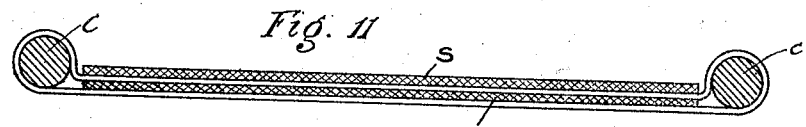
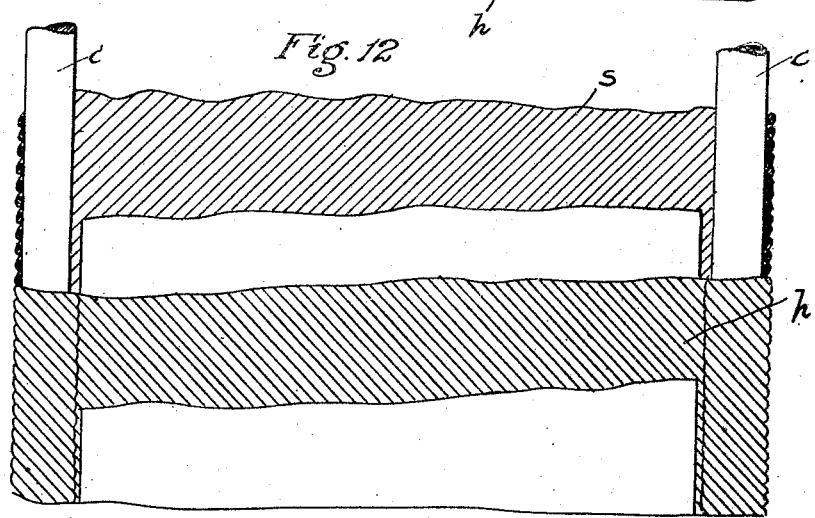

Patented Aug. 24, 1926.

1,597,458

UNITED STATES PATENT OFFICE.

HOWARD I. MORRIS, OF CLEVELAND, OHIO, ASSIGNOR TO THE CORD TIRE MACHINE COMPANY, OF CLEVELAND, OHIO, A CORPORATION OF ARIZONA.

MACHINE FOR AND PROCESS OF MAKING COMPOSITE WEBS.

Original application filed August 8, 1918, Serial No. 248,892. Divided and this application filed November 21, 1918, Serial No. 263,609. Renewed January 26, 1922. Serial No. 532,041.

This invention relates to cord fabric and fabric bead-making machines, and more particularly to machines for making cord fabrics, with edge beads, for vehicle tires. This invention was originally disclosed in the Patent Office in an application for patent for cord fabric and tire-making machines filed by me August 8, 1918, Serial No. 248,892, the subject matter of the present invention having been divided out of said prior application for the purpose of separate patenting.

The invention has for further objects the provision of an improved machine of the character stated which will be superior in point of efficiency, facility in control, positiveness in operation, and quantity of output per time unit, together with elimination of waste material, and which will be generally superior in serviceability and which, furthermore, will turn out a cord fabric with beads which, as a product, will be superior in strength and durability, and inherent stability, such product being adaptable for working up into tire carcasses or tire structures by any suitable agency or instrumentality, such as the machine elements and features to that end disclosed in my said original application.

In accordance with the present invention I provide means for feeding or supplying the textile strands for the production of the cord fabric, together with means for simultaneously feeding bead elements and sheet rubber, shuttle means being provided for roving successive courses of the textile strands around the bead elements and the sheet rubber. The sheet rubber is fed in conjunction with, or using as a vehicle, muslin or other textile spacing strip or sheet which is wound into the rolling sheet rubber, such spacing sheet serving to conduct the sheet rubber beyond the point at which the cord fabric strands are applied to the same and the bead elements. Means are then provided for consolidating the resultant product by intimately pressing together the sheet rubber and the courses of fabric wound in helical progression around the same. To the product thereupon resultant I preferably apply a further sheet of rubber which is consolidated into the channel last produced between the bead elements and the product is then a complete product for making up into tires or tire carcasses, as upon a core, in accordance with the operation of the machine elements provided to that end in the prior application above referred to. Or, any suitable means or agencies may be employed for making up the tire or tire carcasses from such fabric and its beads. The consolidating rolls for intimately pressing together the sheet rubber and courses of fabric wound about the same, and for applying a further sheet of rubber may also be relied upon to feed the resultant fabric to the core upon which the carcasses is formed, or feed it to a drum or other agency upon which it may be taken up or wound and stored away or shipped or otherwise disposed of prior to use.

With the above and other objects in view, the invention consists in the novel provision, formation, combination, association, inter-relation and operation of parts, members and features, all as hereinafter described, shown in the drawings, and finally pointed out in claims.

In the drawings:—

Figure 1 is a plan view of a cord fabric and tire-making machine constructed and organized to include the elements of the present invention, and showing one means and method of utilizing such fabric, with its beads, in the manufacture of tires or tire carcasses.

Figure 2 is an enlarged detail longitudinal sectional view taken upon the line $x^2$—$x^2$, Figure 1, and looking in the direction of the appended arrows;

Figure 3 is a detail transverse sectional view taken upon the line $x^3$—$x^3$, Figure 2, and looking in the direction of the appended arrows;

Figure 4 is a transverse vertical sectional view taken upon the line $x^4$—$x^4$, Figure 1, and looking in the direction of the appended arrows, being likewise a view looking in the direction of the large arrow in Figure 2, parts being broken away and sectioned for completeness of disclosure;

Figure 5 is an enlarged detail elevation of certain of the parts shown in Figure 4;

Figure 6 is a detail transverse sectional view, taken upon the line $x^6$—$x^6$, Figure 2, and looking in the direction of the appended arrows, parts being omitted;

Figure 7 is an enlarged detail isometric partially sectioned view of one of the shuttle spools shown in the other figures and particularly in Figure 2;

Figure 8 is a fragmentary vertical transverse substantially mid-section of the machine shown in Figure 1, and looking toward the left-hand side of the showing in Figure 1, just to the left-hand of the section line $x^4$—$x^4$;

Figure 9 is a detail transverse sectional view, taken upon the line $x^9$—$x^9$, Figure 2, and looking in the direction of the appended arrows;

Figure 10 is an enlarged detail transverse sectional view taken upon the line $x^{10}$—$x^{10}$, Figure 2, and looking in the direction of the appended arrows, through the partially completed bead and tire fabric, and certain features of the machine and the textile conveyor for such partially completed fabric, the fabric being in that stage of development which next precedes the application of the second rubber sheet and a consolidation of the same with the partially completed fabric at the feed or consolidating rolls shown in Figure 8;

Figure 11 is an enlarged detail transverse sectional view of the completed bead and tire fabric after the same has passed the feed and consolidating rolls and is complete and ready to be supplied to the core of a tire-making machine, or to be disposed of otherwise previous to incorporation into a tire carcass or structure;

Figure 12 is a fragmentary and face or plan view, broken away in parts for clearness of illustration, of bead and tire fabric formed and organized in accordance with the present invention.

Referring to the drawings, the particularly organized machine therein disclosed as embodying the invention, in one such possible embodiment, comprises in the main, means A for partially forming tire and tire bead fabric, and means B for completing the formation of such fabric and consolidating the same in form for use in tire formation. C designates generally means for utilizing such bead and tire fabric in the formation of a tire upon a core D. The means A for partially forming tire and bead fabric comprise in the main members $a$ and $b$ for supplying bead-forming material $c$, in separate strands, a member $d$ for supplying sheet rubber, a member $e$ for taking up the textile spacing sheet $f$ which is wound into the roll of sheet rubber supplied by the means $d$, and a member $g$ for wrapping or winding about the bead material $c$ and the sheet rubber $h$ textile strands, cords or threads $k$. Such member $g$ comprises a shuttle element revolving about a tubular central support $l$ through which the bead material $c$ and the sheet rubber are fed. $m$ and $n$ designate respectively members for supplying auxiliary material, for example, bead material, in strand, cord, thread, tape or other extended form, the same if desired being fed to the means C for forming the tire and its beads upon the core D. The means B for feeding and consolidating the partially formed bead and tire fabric which is organized by the means A above generally described, comprises two feed and consolidating rolls $q$ and $r$, the former of which is preferably an idler, and which rolls jointly act upon the partially completed fabric, drawing it, and by preference a second rubber sheet $s$, to themselves and consolidating such fabric and the second rubber sheet $s$. The rubber sheet $s$ is supplied by a member $t$, supported on the frame of the machine in any desired manner. $v$ designates a member for taking up the spacer sheet of muslin or the like, which is wound into the roll on the member $t$. The finally completed and consolidated bead and tire fabric $x$ passes from the feed and consolidating rolls $q$ and $r$ about a master roller included in a member (not shown) for varying the degree of positiveness of torque at the core in ratio with variations of pull or tension upon the completed fabric $x$. The feed and consolidating roller $r$ is positively driven as hereinafter described.

The members $a$ and $b$ comprise drums or rollers 26 rotatably mounted upon arbors 27 and from which respectively the strands of bead material $c$ are drawn by the feed and consolidation rolls $q$ and $r$. Likewise the first sheet rubber element $h$ is drawn from a drum or spool or roller 28 rotatably mounted upon an arbor 29 in suitable vertical guides 30 so as to be always in frictional contact with the periphery of a roll of the taken-up spacer sheet $f$ mounted upon a roller 31 which is rotatable upon an arbor 32 beneath the arbor 29. A platen 33 extends horizontally beneath the path in which the first rubber sheet $h$ and its spacer fabric sheet $f$ are advanced by the feed rolls $q$ and $r$ extending through the tubular support $l$ for the shuttle member $g$. At the left-hand end of the platen 33, as Figures 1 and 2 are read, is provided a guide rod 34 about which the muslin or other textile fabric $f$ is rove and whereby such fabric is caused to double upon its course and returns to and over driven rolls 35 and 36 adjacent to the roller or drum 31, by which such returned fabric is taken up. The driven rollers 35 and 36 are operated by a positively operated drive roller 37 about which is rove the two bead material strands $c$, whereby the return of the muslin to the roller 31 is caused to be in exact step with the feed of such bead material strands $c$ as about to be described. Such strands $c$ are drawn lengthwise of the platen 33, in guide channels 38 at the side edges of such platen, and the first rubber sheet $h$ with its underlying course of fabric $f$ traverses the upper surface of the platen, or descends to such upper surface in the advance of the bead material strands $c$ and such first rubber sheet $h$, and its textile underlying conveyor $f$ are subjected to the wrapping or winding treatment of the threads or strands $k$ supplied by the shuttle member $g$. It will thus be seen that the upper course of the fabric $f$ serves as a conveyer for the first rubber sheet $h$ to and beyond the point at which the textile strands or cords $k$ are wrapped about such first rubber sheet and conveyer and platen and bead material strands. The textile material is returned and wrapped upon the roller 31 in a lower course of travel, and the bead strands $c$ together with the first rubber sheet $h$, both wrapped in the strands or cords $k$ applied in the rotation of the shuttle member $g$, are drawn from the end of the platen by the feed and consolidating rolls $q$ and $r$.

The shuttle member $g$ comprises an annular revolving frame 39 adapted to turn upon the fixed tubular or hollow support $l$, being provided with tracks 40 which are in contact with rollers or bearings 41 mounted in the fixed central tubular support $l$ and projecting through suitable openings therein for working contact with such tracks 40. Mounted upon this annular frame 39 are a plurality of radial spiders 42, 43 and 44, which carry longitudinal spool supporting rods 45 one series of which extends between the spiders 42 and 43 and the other series of which extends between the spider 43 and the spider 44. Upon these spool supporting rods are mounted revoluble spools 46 upon which is wound the material for wrapping or winding the bead material and first rubber sheet, such material being represented by the plurality of strands or cords $k$. As clearly shown in Figure 4 these spools or bobbins 46 are arranged in two continuous annular series, whereby the threads or strands $k$ supplied from the same and drawn off by the advancement of the bead strands with the first rubber sheet, together with the rotation of the shuttle member $g$, are successively and intimately wound upon the said first rubber sheet and bead strands, together with the textile spacer strip $f$. As above stated, at the end of the platen 33 the bead strands and first rubber sheet, together with the winding or wrapping of the strands of the wrappings $k$ are drawn to and by the feed and consolidating rolls $q$ and $r$ for final completion of the bead and tire fabric including the consolidation thereof with the second rubber sheet $s$.

The strands of thread or cord $k$ from each of the spools or bobbins 46 pass first over a groove roller 47 which is mounted between rocker arms 48 carried by the spool frame rods 45 and in turn carrying beyond pivotal supports at 49 brake arms 50 which are applied to brake drums 51 upon the respective spools 46. Spring or other suitable tension devices 52 are applied to the rocker arms 48 to cause the same normally to apply, or tend to apply, the brake arms 50 to the brake drums 51. The tension of the strands $k$ over the groove rollers 47, in the grooves of which the several strands are respectively received, is in opposition to the exertion of such tension devices 52, whereby the spools or bobbins are released for free rotation as demand is made upon them to supply the strands $k$, and whereby conversely a braking action is set up as such demand decreases. From the grooved rolls 47 the strands $k$ pass to a forward grooved roll 53 as shown in detail in Figure 5, and the grooves which respectively accommodate the respective strands $k$. Upon the forward spider, or left-hand spider 42 is mounted a series of spring fingers 54, ranging outwardly and downwardly, and secured at their upper ends by eyes 55 through which the respective strands $k$ pass, such eyes giving a resilient quality to such spring fingers for tension purposes. The respective strands after passing through such eyes 55 pass lengthwise of such fingers and through other terminal eyes 56 and thence to and through looped wire eyes or guides 57 secured to the outer face of the spider 42, whence such strands $k$ pass convergently to the path of the first rubber sheet and the bead strands at the platen 33.

In connection with each of the drums 26 of the members $a$ and $b$ for supplying bead material strands $c$, I provide a brake arm 58 at the upper end of each of which is provided a guide sheave or pulley 59 over which the respective bead strand $c$ passes from the drive roller 37, so that the course of said strands $c$ is brought into parallelism with the platen 33. This brake arm carries a brake shoe 60 which is applied to one end of the spool or drum 26. Each such brake arm is fulcrumed between its ends as at 61 and at the lower end is connected, as at 62 with an equalizer bar 63 from the central portion of which a cable or rope 64 extends to a suitable device, should the same be employed as in a tire-making machine, for controlling the degree of positiveness of rotation of a core, such as D, in accordance with the tension imposed upon the completed fabric which is being built up into a tire. It thus results that the braking action upon the drum 26 at the brake shoe 60 is kept in ratio with the degree of positiveness of the rotation of the core D. It will be understood, however, that this feature is not essential to the tire and tire bead fabric-making machine considered in and by itself.

It will be understood that the partially completed fabric which is the product of the means A above described, may or may not include the first rubber sheet $h$, as this is optional. It may only include the bead strands $c$ and the strands $k$ wrapped about the same. And likewise, the second rubber sheet $s$ may be omitted in the operation of the means B, so that the completed fabric $x$ will be merely a cord fabric having the bead strands at the sides and the cord wrappings about the same. However, under some circumstances and for some purposes and reasons, it is advantageous to incorporate either or both of these rubber sheets in the completed fabric, as it obviates the necessity of separately supplying rubber sheets to the core in the formation of the tire, the same being so ordinarily supplied in alteration with the cord fabric. In that connection it is to be stated that the strands $c$ and $k$ are preferably rubberized or calendared prior to their supply from the members $a$ and $b$ and $g$, so that the cord fabric itself, even without the first and second rubber sheets, partakes of a rubber character.

The feed and consolidating rolls $q$ and $r$ are formed and adapted to receive the partially completed fabric from the means A above described, and to consolidate the same together with the second rubber sheet $s$ supplied by the member $t$. To that end the roll $q$ is provided with spaced peripheral channels or grooves 68 adapted to receive the bead structures comprising the bead strands $c$. The bearings of this roll $q$ are mounted in guides at their ends and adapted to be subjected to the compression of suitable springs operated upon by threaded shafts 70 mounted in the frames 71 which guide such bearings, such shafts being provided with hand wheels 72. This roll is an idler cooperating with the roll $r$ which is positively driven and is of smooth cylindrical form, acting to press the bead strand structures into the groove 68 and to consolidate the two courses or laps of cord fabric composed of the wound or wrapped strands $k$, with the first rubber sheet $h$ between such laps, and also to consolidate with such formation the second rubber sheet $s$ which is fed to the partially formed fabric at the rolls $q$ and $r$, whereby a unitary composite web results. The positively driven roll $r$ is fast upon a shaft 73 the drive for which may be of any preferred nature. The completed fabric is drawn between the rolls $q$ and $r$ in any preferred manner, as by suitable mechanism or by hand.

The operation, method of use and advantages of the improved machine for making the composite web of tire fabric and tire fabric beads, will be readily understood from the foregoing description, taken in conjunction with the accompanying drawings and the following statement.

With the parts in the positions shown in the drawings, the feed and consolidating rolls $q$ and $r$ are operating to draw to themselves the partially completed bead and tire fabric consisting of the bead strands $c$, the first rubber sheet $h$, and the wrapped strands $k$. This partially completed fabric is formed by the means A, the bead material $c$ being supplied at the edges of the platen 33 in the channels 38 in the edges thereof and the first rubber sheet $h$ being fed over its muslin conveyer $f$, and the shuttle member $g$ winding and wrapping the material or strands $k$ around such other elements so that the partially completed fabric is continuously produced. When the partially completed fabric is drawn to the feed and consolidating rolls $q$ and $r$ it receives the second rubber sheet $s$, and said rolls press together and complete and consolidate the bead and tire fabric into its final organization as the fabric $x$. The brake shoes 60 upon the levers 58 thus are varied in their effectiveness in accordance with the demands for supply of bead material from the drums or spools 26. The muslin spacer fabric $f$ is returned after its traverse of the platen 33 and wound upon the drum 31 in step with the withdrawal of bead material $c$ from the drums 26, due to the drive of the rollers 35 and 36 respectively, by the roller 37.

The springs 52 exerting their tension upon the arms 48 carrying the grooved rolls 47 over which the strands $k$ pass from the several spools 46 of the shuttle member $g$ to the grooved roller 53 and over the same to the guide and tension devices through which or in connection with which such strands pass to the zone at which they are wrapped about the tire bead material $c$ and tire material $h$, are of a predetermined tension which is substantially that of the average tension to which the spring fingers 54 are subjected in the operation of the shuttle member. This of course relates only to the spring fingers 54 which are acted upon by the strands $k$ taken from the respective spool 46 of the respective roller 47 acted upon by the respective springs 52. Thus, when the tension upon the respective group of spring fingers 54 falls beneath the average potential of tension, the springs 52 become effective and the brake members 50 are operatively applied to the brake drums 51 to check the rate of rotation of such spools. This action, in prolonged operation of the machine, resolves itself to a balanced condition as between the action of the spring fingers 54 and of the springs 52, so that the proper normal frictional effect of the brake members 50 upon the drums 51 is maintained.

It is obvious that many variations and modifications may be made with respect to the structure and combination of parts and features, herein described and shown in the drawings, in practicing the invention, and with respect to the composite bead and tire fabric produced by such machine, all within the true spirit of the invention and a proper interpretation thereof.

Having thus disclosed my invention, I claim and desire to secure by Letters Patent:—

1. In a machine of the character disclosed, means for supplying bead material, means for associating tire material therewith, and means for wrapping about said associated materials further tire material.

2. In a machine of the character disclosed, means for supplying tire bead material, means for associating sheet rubber therewith, and means for wrapping about said recited elements further tire material.

3. In a machine of the character disclosed, means for supplying tire bead material in spaced parts, means for supplying sheet tire material between said spaced bead material parts, and means for winding about said recited elements further tire material to produce substantially flat resultant material.

4. In a machine of the character disclosed, a platen, means for supplying at the side edges of said platen tire bead material in spaced parts, means for supplying to said platen sheet tire material, and means for wrapping about said elements recited further tire material to produce a substantially flat resultant product.

5. In a machine of the character disclosed, means for supplying sheet tire material together with sheet spacer material whereby said sheet spacer material serves as a conveyer for sheet tire material, and take-up means for said sheet spacer material.

6. In a machine of the character disclosed, the combination of means for supplying sheet tire material together with sheet spacer material for said sheet tire material, a platen over which said materials pass in one direction, said spacer material being returned rearwardly after guiding the tire material onto said platen, and means for taking up said sheet spacer material.

7. In a machine of the character disclosed, an annular support, means for supplying through said support tire bead material and further tire material, and shuttle means mounted to rotate upon said support and adapted to wind about said tire bead material and said further tire material still further tire material supplied by said shuttle means.

8. In a machine of the character described, the combination of means for supplying material in spaced strands, means for supplying sheet material and cord material, mechanism for associating the materials into position for consolidation, said mechanism including means for wrapping the cord material about the spaced strands, and means for consolidating the strands and materials into a unitary web.

9. In a machine of the character described, the combination of means for supplying material in spaced strands, means for supplying sheet material and cord material, mechanism for associating the strands and materials for consolidation, said mechanism including means for wrapping the cord material about the strands, means for supplying further tire material to one surface of the associated materials, and means for consolidating the materials into a unitary web.

10. In a machine of the character disclosed, an annular support, means for supplying bead material in spaced parts through said annular support, and shuttle means mounted to rotate about said support and to wind about said spaced parts of bead material tire material; separate means being provided for supplying tire material through said support in conjunction with said spaced parts of bead material and to receive the wrappings of said tire material jointly with said bead material.

11. In a machine of the character disclosed, an annular support, a platen passing through said support, means for supplying sheet tire material through said support and guided by said platen, and shuttle means mounted to rotate about said support and to wind about said tire material further tire material.

12. In a machine of the character disclosed, a platen, means for supplying tire bead material in spaced parts, said platen being provided with guides for said spaced parts, means for supplying sheet tire material over said platen in conjunction with the tire bead material, and means for wrapping further tire material about the sheet tire and bead materials while the latter traverse said platen and guides.

13. In a machine of the character disclosed, means for supplying tire bead material, and means for checking the action of said supply means responsive to variations in tension upon the material so supplied.

14. In a machine of the character disclosed, a spool from which tire bead material is supplied, a lever, means yieldingly opposing movement of the lever, and brake means for the spool controlled by the lever; said tire bead material being supplied in a path whereby it exerts tension upon said lever to affect the action of said brake means.

15. In a machine of the character disclosed, a member for supplying tire bead material, a member for supplying sheet tire material together with spacer material, means for taking up the spacer material, and means for operating said take-up means in step with the supply of one of the materials.

16. In a machine of the character disclosed, means for supplying tire bead material in spaced parts, means for supplying a wrapping for said tire bead material parts, means for compressing said wrapping between said tire bead material parts, and means for supplying sheet tire material between said bead material parts.

17. In a machine of the character disclosed, means for supplying tire bead material in spaced parts, means for supplying sheet tire material between said spaced parts, means for wrapping further tire material about said spaced parts and said sheet tire material, means for compressing said wrapped material between said spaced parts, and means for supplying further tire material.

18. In a machine of the character disclosed, means for supplying tire bead material in spaced parts, means for supplying sheet tire material between said spaced parts, means for wrapping further tire material about said spaced parts and said sheet tire material, means for compressing said wrapped material between said spaced parts, and means for supplying further sheet tire material between said spaced parts under pressure.

19. In a machine of the character disclosed, means for supplying tire bead material, means for associating sheet tire material therewith, means for wrapping about said recited elements further tire material, and means for compressing said further tire material to closely associate it with said sheet tire material.

20. In a machine of the character disclosed, means for supplying tire bead material in spaced strands, means for winding about said strands further tire material, and means for feeding to said associated materials further tire material.

21. In a machine for making composite webs of tire material, the combination of shuttle means having a rotatable member from which material is supplied in shuttle action, means engaging said member to retard its rotation as the material is supplied therefrom, and means acted upon by the material as it is supplied from said member to control said retarding means, whereby the tension of the material acts in opposition to said retarding means to maintain a substantial uniform supply of the material.

22. In a machine of the character disclosed, the combination of means for simultaneously supplying and guiding into proper associated relationship for consolidation into a unitary web with marginal beads the following material (a) spaced apart tire bead material, (b) tire cord material and (c) rubber material in close association with the cord material, means for wrapping the cord material about the bead material while maintained spaced apart, and means for consolidating the said materials after association into a unitary web of indefinite length.

23. In a machine of the character disclosed, the combination of means for simultaneously associating and guiding into proper associated relationship for consolidation into a unitary web all of the materials which enter into the constitution of a complete tire carcass, including spaced beads, cords and rubber material, said means including a mechanism for wrapping the cords around the beads while spaced apart and means for consolidating all of these materials into a unitary beaded web of indefinite length ready for winding directly into a tire carcass.

24. In a machine of the character disclosed, means for supplying spaced bead material and tire material, means for advancing said materials and subjecting the same to pressure to form a substantially unitary web, and means for varying the rate of operation of said advancing means.

25. In a machine of the character disclosed, the combination of means for continuously supplying and associating tire materials, a plurality of rolls engaging said associated materials transversely from side edge to side edge and serving to consolidate them into a unitary web and advance them, one of said rolls being provided with spaced grooves to receive the folded or thickened edge portions of the web, and means for driving one of said rolls at different rates of speed.

26. In a machine of the character disclosed, means for supplying spaced strands of tire bead material, means for supplying between said strands sheet material, and means for wrapping about said spaced strands and sheet material a further tire material during the active supply thereof, whereby a progressing helical wrapping is provided.

27. In a machine of the character described, the combination of means for supplying sheet tire material, means for simultaneously supplying along the opposite longitudinal edges of said sheet tire material bead material, and means for wrapping a cord continuously around said sheet tire material and bead material.

28. In a machine of the character described, the combination of means for supplying sheet tire material, means for simultaneously supplying along the opposite longitudinal edges of said sheet tire material bead material, means for wrapping a cord continuously around said sheet tire material and bead material, and means for maintaining said sheet tire material and said bead material in substantially fixed relationship while being wrapped.

29. In a machine of the character described, the combination of means for supplying a pair of spaced bead materials, means for winding a cord about said spaced bead material, and means for supplying sheet material in line with the feed of said bead materials.

30. In a machine of the character described, the combination of means for supplying a pair of spaced bead materials, means for winding a cord about said bead materials to form tire making material, and means for supplying sheet material to said tire making material.

31. In a machine of the class described, the combination of means for supplying a pair of spaced materials, means for supplying a plurality of sheet materials, and means for supplying cord material between said sheet material supply means and wrapping said cord material around the spaced materials and the sheet of material supplied by one of said sheet supply means.

32. In a machine of the class described, the combination of means for supplying a pair of spaced materials, means for supplying a plurality of sheet materials in line with the feed of said spaced materials, and means for supplying cord material between said sheet material supply means and wrapping said cord material around said spaced materials and the sheet of material supplied by one of said sheet supply means.

33. In a machine of the character described, the combination of means for supplying tire material, means for winding a cord around said tire material to form a corded web, and means for supplying sheet rubber material upon one surface of said web.

34. In a machine of the character described, the combination of means for supplying a pair of tire bead materials, means for supplying sheet tire material between said bead materials, means for winding further tire material around said bead materials and sheet tire materials, and means for supplying to the product formed further tire material.

35. In a machine of the character described, the combination of means for supplying a pair of tire bead materials, means for supplying sheet tire material between said bead materials, means for winding further tire material around said bead materials and sheet tire material, and means for supplying to the product formed further sheet tire material.

36. In a machine of the character described, the combination of means for supplying bead material in spaced parts, means for wrapping cord material about the bead material spaced parts to form tire making material, means for supplying sheet material to said tire making material, and means for consolidating the materials into a substantially unitary web.

37. The herein disclosed process which consists in supplying and feeding forward the materials for tire beads in spaced relationship to each other, winding around the bead materials while spaced apart and advancing cord material for the production of the body of the tire carcass, supplying rubber material in intimate relationship to the cord material, and consolidating the said materials after they have been brought together in proper relationship into a unitary web of indefinite length.

38. The herein disclosed process for producing carcasses for cord tires, which consists in supplying, feeding forward and properly associating all the materials which enter into the carcass, including supplying bead strands of indefinite length and properly spaced apart, wrapping about the beads cord material intimately associated with rubber material, consolidating the said materials into a unitary web of indefinite length and delivering the said web directly to shaping apparatus to form the carcass.

39. The herein disclosed process which consists in continuously supplying and feeding forwardly bead material in spaced parts and sheet material therebetween, then in winding around the spaced parts and sheet material tire material, and finally in consolidating the materials into a unitary web.

40. The herein disclosed process which consists in continuously supplying and feeding forwardly bead material in spaced parts, then in winding around the spaced parts of bead material tire material, and then in continuously supplying sheet material to one side of the materials thus associated, and finally in consolidating the materials into a unitary web.

41. The herein disclosed process which consists in continuously supplying and feeding forwardly bead material in spaced parts and sheet material therebetween, then in winding around the spaced parts and sheet material cord material, and then in continuously supplying sheet material to one side of the materials thus associated, and finally in consolidating the materials into a unitary web.

42. The herein described process which consists in continuously supplying and feeding forwardly a sheet of tire material, then in winding around the sheet of tire material as it feeds forwardly cord material, and finally in consolidating the materials into a unitary web.

43. The herein described process which consists in continuously supplying and feeding forwardly a sheet of tire material together with a supporting material, then in winding around the sheet of tire material as it feeds forwardly cord material, then in separating the supporting material from the sheet of tire material, and finally in consolidating the materials into a unitary web.

44. The herein described process which consists in continuously supplying and feeding forwardly a sheet of tire material, then in winding around the sheet of tire material cord material, then in continuously supplying further sheet material to one face or side of the materials thus associated, and finally in consolidating the materials into a unitary web.

45. The herein described process which consists in supplying a continuous sheet of tire forming material together with a continuous supporting material, then in wrapping around said sheet of material in helical arrangement a cord or strand, then in separating the supporting material from the sheet of tire material, and finally progressively consolidating said sheet of material and cord or strand into tire forming material.

46. In apparatus of the class described, the combination of sources of supply for spaced bead elements and sheet tire material, means for guiding the spaced bead elements in parallelism and the sheet tire material in the plane of and between the bead elements, means for winding further tire material about the bead elements and sheet tire material as they move relative to said guiding means.

47. In apparatus of the class described, the combination of sources of supply for spaced bead and sheet tire materials, means for guiding the spaced bead material in parallelism and the sheet tire material in the plane of and between the bead material, means for winding a cord around the bead and tire materials as they traverse said guiding means, and means for supplying auxiliary material to the materials.

48. In a machine of the character described, the combination of means for supplying spaced material, shuttle acting means for wrapping tire material about said spaced material, means for consolidating said materials into a unitary web, and spring actuated means carried by said shuttle acting means and acted upon by the material as it is supplied thereby to control the tension of the material.

49. In a machine of the character described, the combination of a shuttle carrying a material supply means, a guide extending axially of said shuttle, means for supplying a plurality of different materials through said shuttle to said guide, and means for rotating said shuttle to wrap material carried thereby about the materials supplied to said guide.

In testimony whereof, I have signed my name to this specification.

HOWARD I. MORRIS.